(12) United States Patent
Fujita et al.

(10) Patent No.: US 9,739,394 B2
(45) Date of Patent: Aug. 22, 2017

(54) SOLENOID VALVE

(71) Applicant: JTEKT CORPORATION, Osaka-shi (JP)

(72) Inventors: Kaori Fujita, Kariya (JP); Toshio Murakami, Nagoya (JP); Itsuki Ono, Tokai (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/945,962

(22) Filed: Nov. 19, 2015

(65) Prior Publication Data

US 2016/0146367 A1 May 26, 2016

(30) Foreign Application Priority Data

Nov. 25, 2014 (JP) .................................. 2014-237915
Apr. 6, 2015 (JP) .................................. 2015-077913

(51) Int. Cl.
*F16K 31/06* (2006.01)
*F16K 11/07* (2006.01)
*H01F 7/16* (2006.01)

(52) U.S. Cl.
CPC .......... *F16K 31/0675* (2013.01); *F16K 11/07* (2013.01); *F16K 31/0613* (2013.01); *H01F 7/1607* (2013.01)

(58) Field of Classification Search
CPC .. F16K 11/07; F16K 31/0613; F16K 31/0675; H01F 2007/163
USPC ................................................... 251/129.15
See application file for complete search history.

(56) References Cited

U.S. PATENT DOCUMENTS

| 5,848,613 | A * | 12/1998 | Sakaguchi | ........... F15B 13/0402 137/625.65 |
| 8,499,795 | B2 * | 8/2013 | Tomoda | .............. F15B 13/0817 137/884 |
| 8,800,399 | B2 * | 8/2014 | Mills | .................... F16H 61/0251 137/118.02 |
| 8,925,522 | B2 * | 1/2015 | Landenberger | ........ F02M 59/36 123/458 |

(Continued)

FOREIGN PATENT DOCUMENTS

| JP | 2008-267475 A | 11/2008 |
| JP | 2009-103219 A | 5/2009 |
| JP | 2014-105726 | 6/2014 |

OTHER PUBLICATIONS

Extended European Search Report issued on Apr. 13, 2016 in European Patent Application No. 15195111.8.

*Primary Examiner* — Matthew W Jellett
(74) *Attorney, Agent, or Firm* — Oblon, McClelland, Maier & Neustadt, L.L.P.

(57) ABSTRACT

A solenoid valve is provided which can be reduced in size while allowing a plunger and a shaft to slide smoothly. A solenoid valve includes a solenoid portion with a plunger that moves in an axial direction using a magnetic force generated by a solenoid coil. The solenoid portion has a cover member that houses the plunger, a shaft that is movable in the axial direction along with the plunger, and a core member that attracts the plunger in the axial direction. The shaft is supported by a first bearing portion formed on a cylindrical portion of the core member and a second bearing portion formed on a second bottom portion of the cover member such that the shaft is movable in the axial direction.

7 Claims, 12 Drawing Sheets

(56) References Cited

U.S. PATENT DOCUMENTS

2005/0218362 A1* 10/2005 Furuta ................ F16K 11/0716
                                                         251/129.15
2009/0032752 A1    2/2009 Nagasaki
2011/0168930 A1*  7/2011 Tomoda ............. F15B 13/0817
                                                         251/129.15

* cited by examiner

FIG. 1A
(FIRST EMBODIMENT)

FIG.1B

FIG. 2
(FIRST EMBODIMENT)

FIG. 3A
(FIRST EMBODIMENT)

A-A SECTION

FIG. 3B

B-B SECTION

FIG. 4
(SECOND EMBODIMENT)

FIG. 5A
(THIRD EMBODIMENT)

FIG. 6A
(VARIATIONS OF THIRD EMBODIMENT)

SOLENOID VALVE

INCORPORATION BY REFERENCE

The disclosure of Japanese Patent Application No. 2014-237915 filed on Nov. 25, 2014 and No. 2015-077913 filed on Apr. 6, 2015 including the specification, drawings and abstract, is incorporated herein by reference in its entirety.

BACKGROUND OF THE INVENTION

1. Field of the Invention

The invention relates to a solenoid valve that controls a pressure on a working fluid according to a current supplied to a coil.

2. Description of Related Art

A solenoid valve is conventionally known which includes a solenoid portion generating an electromagnetic force, a tubular sleeve with a valve hole, and a shaft-like spool moving through the valve hole in an axial direction and in which a pressure on a working fluid is controlled by the movement of the spool in the axial direction (see, for example, Japanese Patent Application Publication No. 2014-105726 (JP 2014-105726 A).

The solenoid valve described in JP 2014-105726 A has a solenoid portion with a plunger that moves in the axial direction according to a current supplied to a solenoid coil, a sleeve shaped like an inner tube and disposed coaxially with the plunger, and a spool that is housed in a valve hole formed in the sleeve and that slides on an inner surface of the sleeve in conjunction with the movement of the plunger in the axial direction.

The solenoid portion has a solenoid coil, a tubular cover member (solenoid case) made of a magnetic material supporting the solenoid coil, a core member (solenoid core) made of a magnetic material, and a plunger that moves in the axial direction with respect to the cover member. The core member has, in a central portion thereof, a through-hole that penetrates the core member in the axial direction, and a shaft is inserted through the through-hole. At an end of the core member that is on the opposite side to a sleeve, a cylindrical yoke portion having a recess is provided. One end of the plunger is fitted in the recess.

When a current is passed through the solenoid coil, the plunger is attracted by a resultant electromagnetic force toward a bottom surface of the recess of the cylindrical yoke portion of the core member. A slight gap (air gap) is formed between an inner peripheral surface of the recess and an outer peripheral surface of the plunger. A magnetic flux generated in the solenoid coil circles around the solenoid coil along a magnetic path including this air gap.

Under the magnetic force of the solenoid coil, the plunger moves forward and backward in the axial direction along with the shaft to press the sloop via the shaft, thus moving the spool in the valve hole. Consequently, a channel for a working fluid in the valve hole is switched to change a pressure under which the working fluid is fed to a control target apparatus.

The shaft is supported by a first bearing bushing disposed in the through-hole in the core member such that the shaft is movable in the axial direction. The plunger is supported by a second bearing bushing disposed inside the cover member such that the plunger is movable in the axial direction.

In the solenoid valve configured as described above, slight gaps need to be formed between the first bearing bushing and the shaft and between the second bearing bushing and the plunger in order to allow the plunger and the shaft to move smoothly in the axial direction. Large gaps may increase backlash of the plunger and the shaft with respect to the core member and the cover member to vary the width of the air gap between the inner peripheral surface of the recess of the core member and the outer peripheral surface of the plunger. A pressing force according to the current supplied to the solenoid coil may not be applied to the spool. On the other hand, excessively small gaps between the first bearing bushing and the shaft and between the second bearing bushing and the plunger may hinder the plunger and the shaft from sliding smoothly.

In the solenoid valve described in JP 2014-105726, inside the core member and the cover member, the first bearing bushing and the second bearing bushing are disposed in the magnetic path for the magnetic flux generated in the solenoid coil. This reduces magnetic efficiency. Furthermore, in addition to machining errors in the core member and the cover member, dimensional errors in the first and second bushing bearings in a radial direction affect the sizes of the gaps between the first bearing bushing and the shaft and between the second bearing bushing and the plunger. Thus, to allow the plunger and the shaft to move smoothly in the axial direction, the backlash of the plunger and the shaft with respect to the core member and the cover member needs to be permitted, and large air gaps accordingly need to be set between the inner peripheral surface of the recess of the core member and the outer peripheral surface of the plunger.

However, setting large air gaps between the inner peripheral surface of the recess of the core member and the outer peripheral surface of the plunger increases magnetic resistance in the magnetic path for the magnetic flux generated in the solenoid coil, which reduces magnetic efficiency. Thus, the magnetic force that may be generated in the solenoid coil needs to be strengthened by, for example, increasing the number of turns of a winding of the solenoid coil. This is conventionally a restriction on reducing the size of the solenoid valve.

SUMMARY OF THE INVENTION

It is an object of the present invention to provide a solenoid valve that is reduced in size and allows a plunger and a shaft to slide smoothly.

According to an aspect of the present invention, a solenoid valve includes a cylindrical sleeve with a plurality of ports formed therein through which a working fluid flows, a shaft-like spool that moves through the sleeve in an axial direction to open and close the ports, and a solenoid portion that moves the spool in the axial direction with respect to the sleeve.

The solenoid portion includes a tubular solenoid coil supplied with a current to generate a magnetic force, a cover member made of a magnetic material surrounding the solenoid coil, a shaft supported so as to be movable in the axial direction along a central axis of the solenoid coil to apply an axial moving force to the spool, a plunger that is movable in the axial direction along with the shaft, and a magnetic material core that attracts the plunger using the magnetic force generated in the solenoid coil.

The cover member has an outer tubular portion that covers an outer periphery of the solenoid coil, a first bottom portion that covers an end of the solenoid coil that is on the opposite side to the sleeve, an inner tubular portion interposed between an end of the solenoid coil close to the first bottom portion and the plunger, and a second bottom portion formed to protrude inward in a radial direction with respect to the inner tubular portion and facing the plunger in the axial direction.

The magnetic material core is interposed between the shaft and the solenoid coil in the radial direction and faces the plunger and the inner tubular portion of the cover member in the axial direction, and the magnetic material core has a cylindrical portion with an insertion hole which is formed in a central portion of the cylindrical portion and through which the shaft is inserted, and a flange portion that couples the cylindrical portion and the outer tubular portion of the cover member together.

The shaft is supported by a first bearing portion formed on the magnetic material core and a second bearing portion formed on the second bottom portion of the cover member, and the first bearing portion is formed such that a part of the cylindrical portion of the magnetic material core in the axial direction protrudes inward in the radial direction so as to contact an outer peripheral surface of the shaft in a sliding manner.

The second bearing portion is formed by forming, in the second bottom portion of the cover member, a sliding hole in which the shaft protruding from the plunger is held so as to slide freely.

According to the aspect, the solenoid valve can be reduced in size while allowing the plunger and the shaft to slide smoothly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
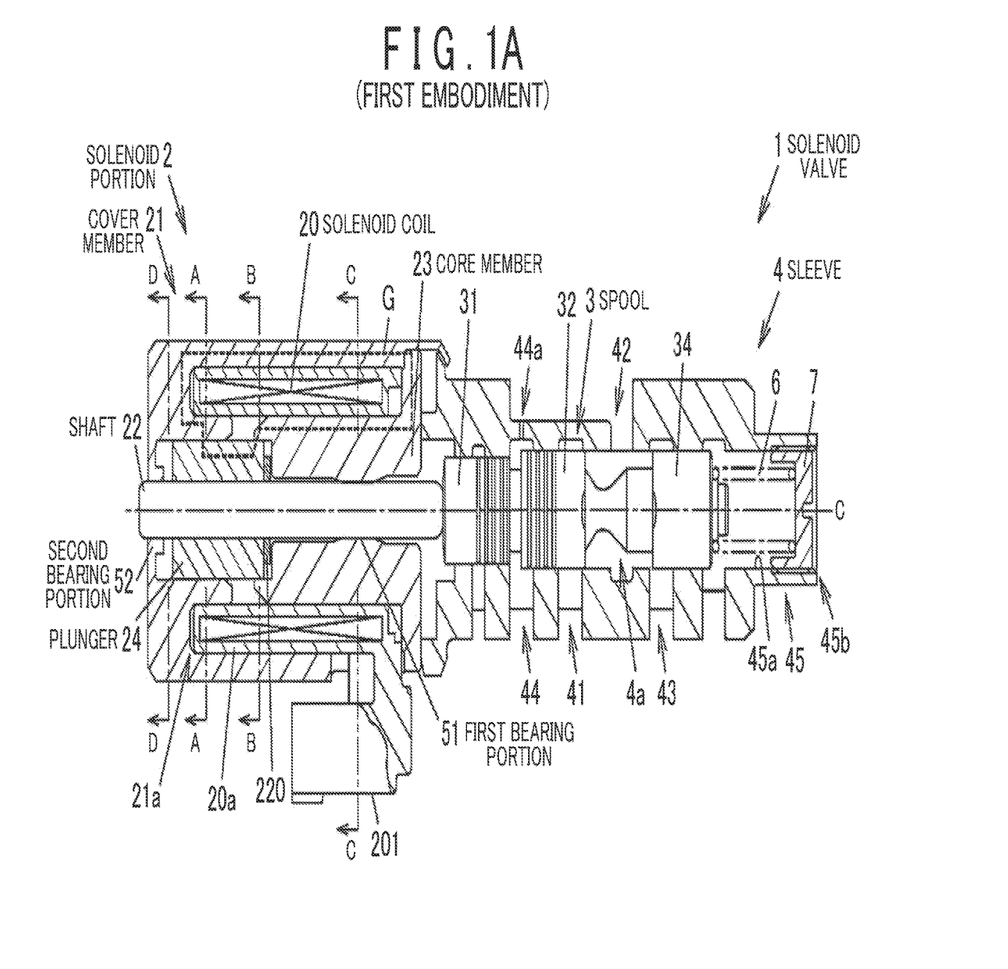
FIG. 1A is a sectional view of a solenoid valve according to a first embodiment of the present invention in a configuration example, depicting an energized state where a current is passed through a solenoid coil.
Figure 1B:
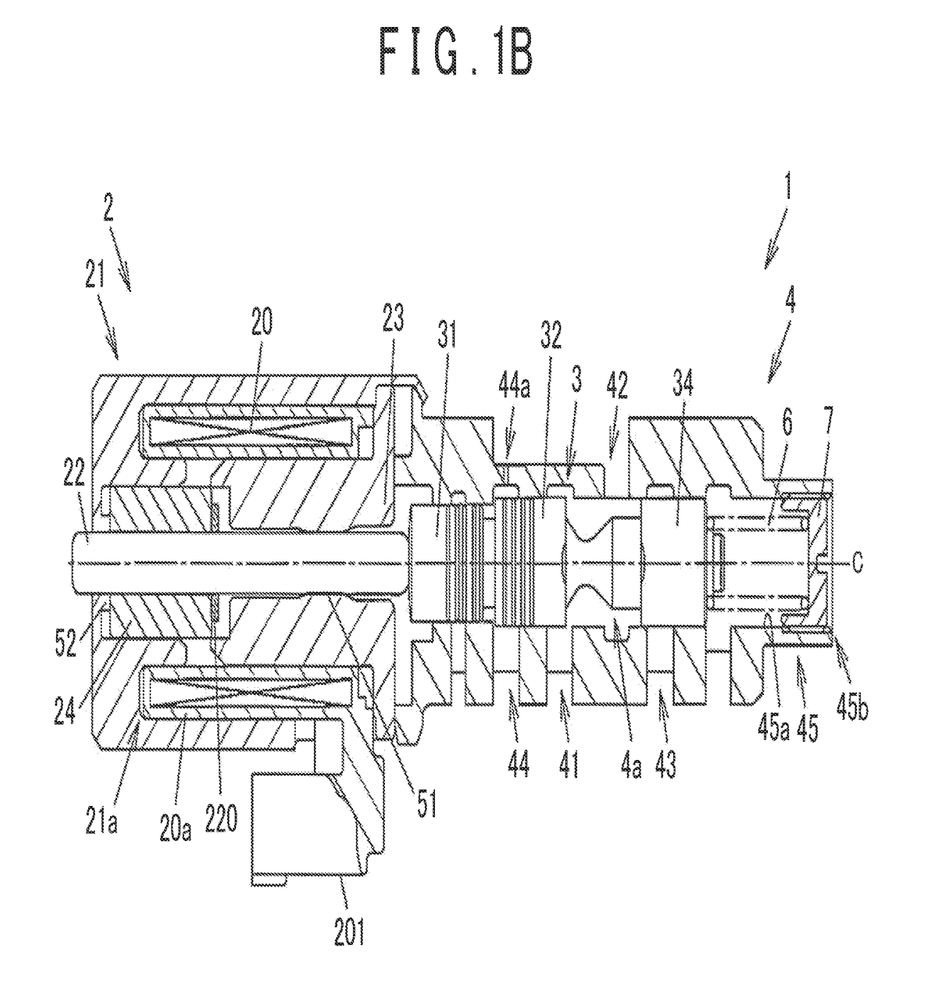
FIG. 1B is a sectional view of the solenoid valve according to the first embodiment of the present invention in the configuration example, depicting a de-energized state.
Figure 2:
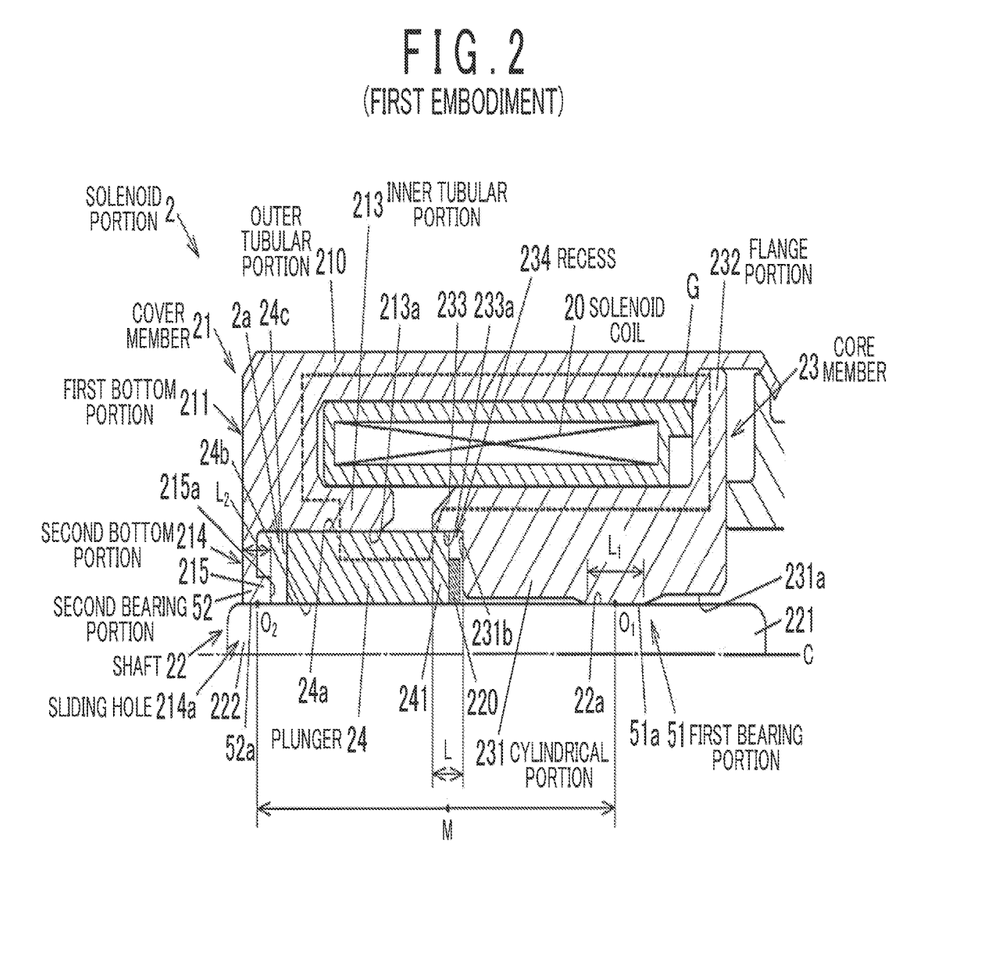
FIG. 2 is an enlarged view of a solenoid portion and a peripheral portion thereof in the solenoid valve according to the first embodiment.
Figure 3A:
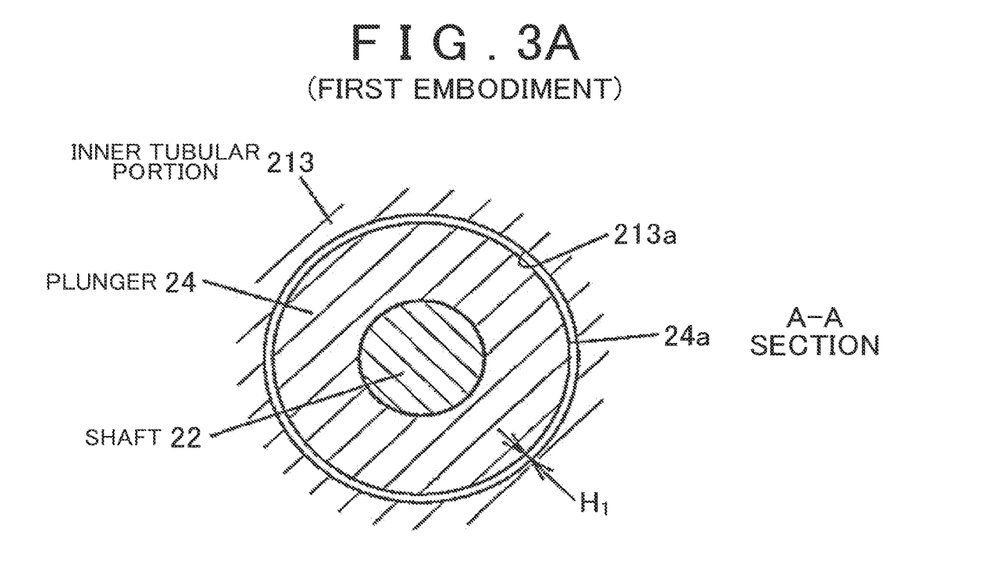
FIG. 3A is a sectional view taken along line A-A in FIG. 1A.
Figure 3B:
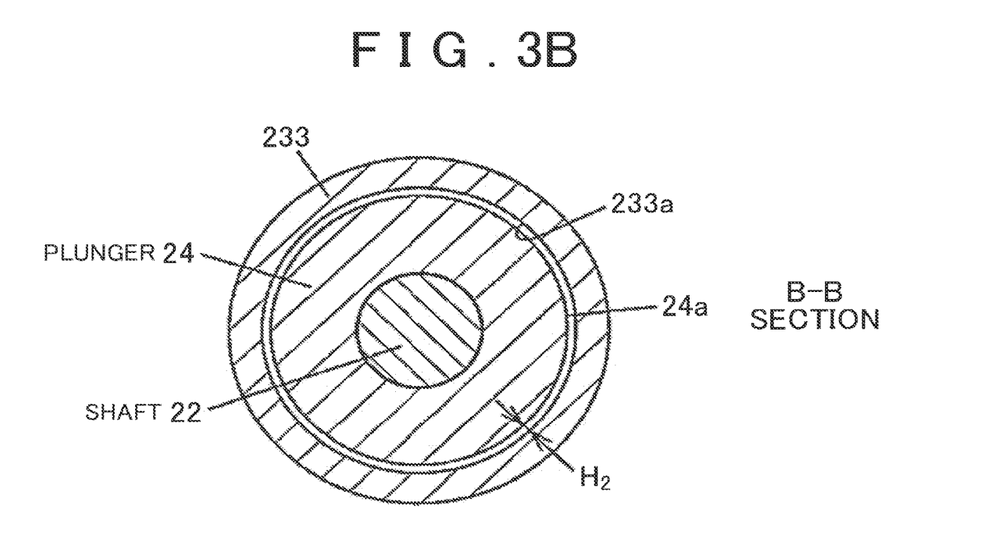
FIG. 3B is a sectional view taken along line B-B in FIG. 1A.
Figure 3C:
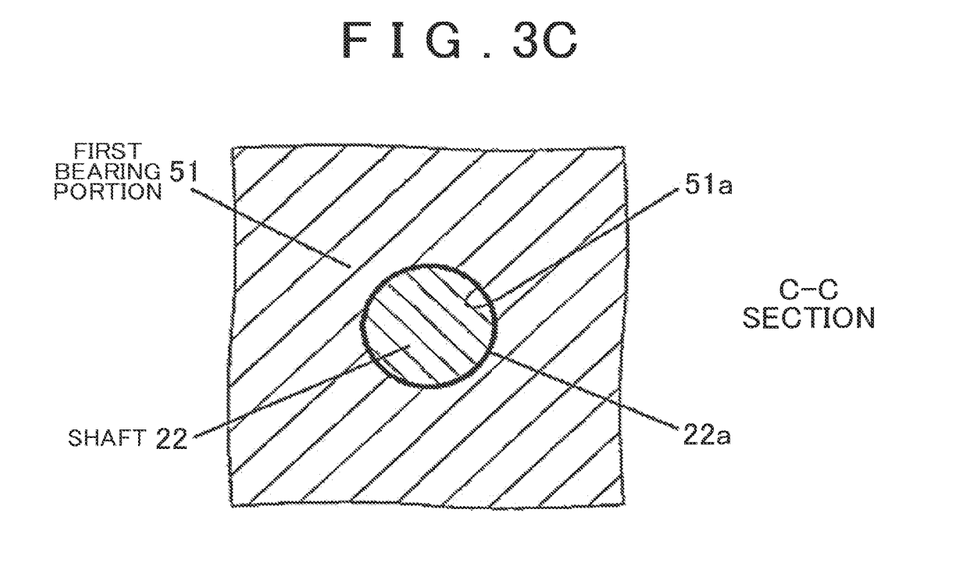
FIG. 3C is a sectional view taken along line C-C in FIG. 1A.
Figure 3D:
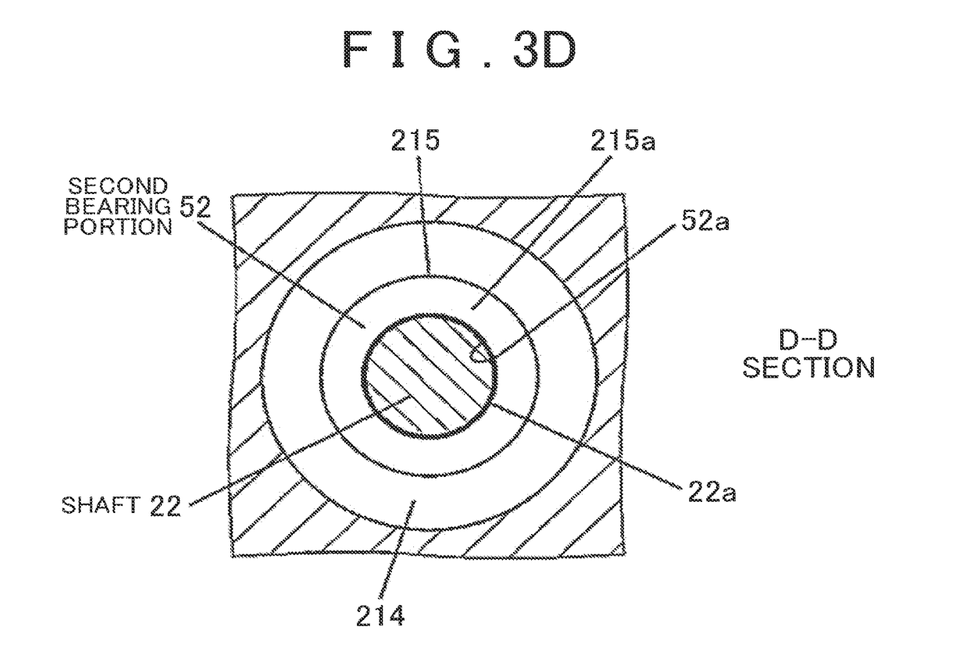
FIG. 3D is a sectional view taken along line D-D in FIG. 1A.

Configurations and operations of a solenoid valve according to a first embodiment of the present invention will be described with reference to FIGS. 1A to 3. FIG. 1A and FIG. 1B are a sectional views of the solenoid valve according to the present embodiment in a configuration example. FIG. 1A depicts an energized state, and FIG. 1B depicts a de-energized state. FIG. 2 is an enlarged view of a solenoid portion and a peripheral portion thereof in the solenoid valve depicted in FIG. 1A. FIG. 3A is a sectional view taken along line A-A in FIG. 1A, FIG. 3B is a sectional view taken along line B-B in FIG. 1A, FIG. 3C is a sectional view taken along line C-C in FIG. 1A, FIG. 3D is a sectional view taken along line D-D in FIG. 1A. FIG. 3A depicts only parts of a shaft, a plunger, and a cover member. FIG. 3B depicts only parts of the shaft, the plunger, and a core member.

A solenoid valve 1 has a solenoid portion 2 with a plunger 24 that moves in an axial direction according to a current supplied to a solenoid coil 20, a tubular sleeve 4 disposed coaxially with the plunger 24, and a spool 3 housed in a valve hole 4a formed in the sleeve 4 and sliding on an inner surface of the sleeve 4 in conjunction with movement of the plunger 24 in the axial direction.

The sleeve 4 is a cylindrical member with a plurality of ports formed therein. A working fluid fed from an oil pump not depicted in the drawings flows through the ports. More specifically, the sleeve 4 has a supply port 41 through which the working fluid is fed, an output port 42 that communicates with the supply port 41 to output the working fluid to a control target (for example, a clutch of an electronically controlled automatic transmission) while the solenoid portion 2 is in the de-energized state, a discharge port 43 that communicates with the output port 42 to discharge the working fluid while the solenoid portion 2 is in the energized state, a feedback port 44 through which a portion of the working fluid having flown out through the output port 42 flows in via a feedback port hole 44a, and a tubular portion 45 containing a spring chamber 45a that houses a coil spring 6.

The tubular portion 45 is provided at an end of the sleeve 4 that is on the opposite side to the solenoid portion 2, and the opening 45b of the tubular portion 45 is closed by a cap member 7. The cap member 7 has an external thread formed on its outer peripheral surface and screwed in an internal thread formed in the tubular portion 45. The cap member 7 is attached to the tubular portion 45 so as to be positionally adjustable with respect to the sleeve 4.

A spool 3 is a shaft-like member that moves through the sleeve 4 in the axial direction to open and close the supply port 41, the output port 42, and the feedback port 44. The spool 3 has a first land portion 31, a second land portion 32 having a larger diameter than the first land portion 31, a small diameter portion 33 having a smaller diameter than the second land portion 32, and a third land portion 34; the first land portion 31, the second land portion 32, the small diameter portion 33, and the third land portion 34 are disposed in this order from a solenoid portion 2 side.

The spool 3 is elastically biased toward the solenoid portion 2 by the coil spring 6 that is in contact with an end face of the third land portion 34 that is on the opposite side to the solenoid portion 2 in the axial direction. A tip portion 221 of a shaft 22 disposed inside the solenoid portion 2 is constantly in contact with an end face of the first land portion 31 that is close to the solenoid portion 2 in the axial direction.

The solenoid portion 2 has the tubular solenoid coil 20 supplied with a current to generate a magnetic force, a tubular cover member 21 that surrounds the solenoid coil 20, the shaft 22 supported so as to be movable in the axial direction along a central axis C of the solenoid coil 20 to apply a moving force to the spool 3, a core member 23 serving as a magnetic material core to attract the plunger 24 using a magnetic force generated in the solenoid coil 20, and the plunger 24 that moves in the axial direction with respect to the cover member 21 and the core member 23. The cover member 21, the core member 23, and the plunger 24 are magnetic bodies and form a magnetic path G for a magnetic flux generated by the solenoid coil 20.

The solenoid coil 20 is housed in an annular coil housing space 21a formed in the cover member 21 and is sealed in the space with a bobbin 20a formed of resin. The solenoid coil 20 generates a magnetic flux when supplied with an excitation current flowing through a connector portion 201 fixed to an outer periphery of the cover member 21.

As depicted in FIG. 2, the cover member 21 integrally has an outer tubular portion 210 that covers an outer peripheral surface of the solenoid coil 20, a first bottom portion 211 that covers an end of the solenoid coil 20 that is on the opposite side to the sleeve 4, an inner tubular portion 213 interposed between an end of the solenoid coil 20 that is close to the first bottom portion 211 and the plunger 24, and a second bottom portion 214 formed to protrude inward in the radial direction with respect to the inner tubular portion 213 and to face the plunger 24 in the axial direction. On the second bottom portion 214, an annular protruding portion 215 is provided which protrudes toward the plunger 24 along the shaft 22. An end face 24c of the plunger 24 close to the second bottom portion 214 is brought into contact with a distal end face 215a of the protruding portion 215 while no current is passed through the solenoid coil 20.

As depicted in FIG. 3A, an inner peripheral surface 213a of the inner tubular portion 213 directly faces an outer peripheral surface 24a of the plunger 24. The expression "directly facing" as used herein refers to the inner peripheral surface and the outer peripheral surface directly facing each other with no other member interposed between the inner and outer peripheral surfaces. When the gap between the outer peripheral surface 24a of the plunger 24 and the inner peripheral surface 213a of the inner tubular portion 213 of the cover member 21 is denoted by H1, H1 is, for example, 0.2 mm if the plunger 24 has an outer diameter of approximately 10 mm.

The core member 23 integrally has a cylindrical portion 231 with an insertion hole 231a formed in a central portion of the core member 23 so that the shaft 22 is inserted through the insertion hole 231a, a flange portion 232 that couples the cylindrical portion 231 and the outer tubular portion 210 of the cover member 21 together, and a rib portion 233 formed to protrude in the axial direction from a peripheral portion of an end of the cylindrical portion 231 that is on the opposite side to the flange portion 232. The cylindrical portion 231 is interposed between the shaft 22 and the solenoid coil 20 in the radial direction and faces the plunger 24 and the inner tubular portion 213 of the cover member 21 in the axial direction.

As depicted in FIG. 3B, the rib portion 233 is cylindrical and has an inner peripheral surface 233a directly facing the outer peripheral surface 24a of the plunger 24. When the gap between the outer peripheral surface 24a of the plunger 24 and the inner peripheral surface 233a of the rib portion 233 is denoted by H2, H2 is, for example, 0.1 mm.

Space located radially inward of the rib portion 233 is formed as a recess 234 in which an end 241 of the plunger 24 that is close to the sleeve 4 in the axial direction is fitted. Between the cylindrical portion 231 of the core member 23 and second bottom portion 214 of the cover member 21 in the axial direction, a housing space 2a is formed in which the plunger 24 is housed.

The plunger 24 is externally fitted on the shaft 22 and housed in the housing space 2a so as to be movable along with the shaft 22 in the axial direction. A through-hole 24b is formed in a central portion of the plunger 24 so as to penetrate the plunger 24 in the axial direction. The shaft 22 is press-fitted in the through-hole 24b.

The shaft 22 is supported by a first bearing portion 51 formed on the cylindrical portion 231 of the core member 23 and a second bearing portion 52 formed on the second bottom portion 214 of the cover member 21 such that the shaft 22 is movable in the axial direction. The shaft 22 has a surface hardness set higher than the surface hardness of the first bearing portion 51 and the second bearing portion 52. Thus, the shaft 22 slides smoothly.

The shaft 22 is inserted through the insertion hole 231a in the cylindrical portion 231 of the core member 23. The tip portion 221 of the shaft 22 that is close to the spool 3 in the axial direction protrudes from a flange portion 232 side of the core member 23. The tip portion 221 of the shaft 22 protruding from the flange portion 232 side of the core member 23 is in contact with one end of the spool 3 to press the spool 3 toward a first side in the axial direction along the central axis C. Thus, an axial moving force is applied to the spool 3.

A spacer 220 is fixed to an outer periphery of the shaft 22 to cushion an impact on the shaft 22 that occurs when the plunger 24 comes into contact with core member 23.

The first bearing portion 51 is formed to protrude inward in the radial direction such that a part of the cylindrical portion 231 of the core member 23 in the axial direction is in sliding contact with an outer peripheral surface 22a of the shaft 22. An inner surface of a protruding portion of the first bearing portion 51 is formed as a sliding contact surface 51a that is in sliding contact with the outer peripheral surface 22a of the shaft 22. The first bearing portion 51 is formed to have an inner diameter slightly larger than the outer diameter of the shaft 22.

The second bearing portion 52 is formed by forming, in the second bottom portion 214 of the cover member 21, a sliding hole 214a in which the shaft 22 protruding from the plunger 24 is slidably held in the sliding hole 214a. An inner peripheral surface of the second bearing portion 52 is formed as a sliding contact surface 52a that is in sliding contact with the outer peripheral surface 22a of the shaft 22. The sliding hole 214a is formed to penetrate the second bottom portion 214 of the cover member 21 in the axial direction such that the shaft 22 protruding from the plunger 24 penetrates the sliding hole 214a with a base end 222 of the shaft 22 externally exposed from the cover member 21. The second bearing portion 52 is formed to have an inner diameter formed slightly larger than the outer diameter of the shaft 22.

In the present embodiment, an inner surface of the sliding hole 214a includes the inner surface of the annular protruding portion 215, which forms a part of the sliding contact surface 52a of the second bearing portion 52. That is, the second bearing portion 52 protrudes from the second bottom portion 214 so as to shape a cylinder including the protruding portion 215 and the sliding hole 214a serving as an inner peripheral surface. In other words, in the present embodiment, the length of the second bearing portion 52 is equal to the sum of the thickness of the second bottom portion 214 and the length by which the protruding portion 215 protrudes from the second bottom portion 214.

The first bearing portion 51 and the second bearing portion 52 are set to have a substantially equivalent inner diameter. That is, the difference between the inner diameter of the first bearing portion 51 and the second bearing portion 52 and the outer diameter of the shaft 22 is, for example, 0.02 mm when the outer diameter of the shaft 22 is approximately 4 mm.

When that an axially central position of the sliding contact surface 51a of the first bearing portion 51 that is an intermediate point of an axial distance L1 of the sliding contact surface 51a is denoted by O1 and an axially central position of the sliding contact surface 52a of the second bearing portion 52 that is an intermediate point of an axial distance L2 of the sliding contact surface 52a is denoted by O2, an inter-bearing central position M that is an intermediate point between the axially central position O1 and the axially central position O2 lies within the axial range of the recess 234 as depicted in FIG. 2. In this regard, the axial range refers to the range of an axial distance L from an end face 231b of the cylindrical portion 231 of the core member 23 that is close to the plunger 24 in the axial direction to a distal end portion of the rib portion 233. The end face 231b is formed as a bottom surface of the recess 234.

Now, operations of the solenoid valve 1 will be described. When a current is supplied to the solenoid coil 20, the magnetic path G is formed along which a magnetic flux passes through the cover member 21, the core member 23, and the plunger 24 as depicted in FIG. 1A and FIG. 2, The route of the magnetic flux in the magnetic path G starts at the flange portion 232 of the core member 23 and passes through the outer tubular portion 210 of the cover member 21, the first bottom portion 211 of the cover member 21, the inner tubular portion 213 of the cover member 21, the outer peripheral portion of the plunger 24, the rib portion 233 of the core member 23, and the outer peripheral portion of the cylindrical portion 231 of the core member 23 in this order and then ends at the flange portion 232 of the core member 23.

An electromagnetic force is generated according to a magnetic flux passing through the magnetic path G formed as described above. The electromagnetic force causes the plunger 24 to be attracted toward the sleeve 4 in the axial direction, and thus the shaft 22 presses the spool 3. The spool 3 then moves toward the tubular portion 45 in the axial direction as depicted in FIG. 1A. Thus, the second land portion 32 of the spool 3 blocks the communication between the supply port 41 and the output port 42, while the output port 42 and the discharge port 43 communicate with each other via an outer periphery of the small diameter portion 33 of the spool 3.

On the other hand, when the supply of the current to the solenoid coil 20 is stopped, the spool 3 moves toward the solenoid portion 2 as depicted in FIG. 1B. Thus, the supply port 41 and the output port 42 communicate with each other via the outer periphery of the small diameter portion 33, while the communication between the output port 42 and the discharge port 43 is blocked by the third land portion 34 of the spool 3. That is, the solenoid valve 1 switches the state of the communication between the supply port 41 and the output port 42 and the discharge port 43 according to the axial movement of the spool 3.

As described above, the solenoid valve 1 changes a channel area for the working fluid between the supply port 41 and the output port 42 and a channel area between the output port 42 and the discharge port 43 to control the pressure on the working fluid passing through the solenoid valve 1.

The above-described first embodiment allows production of the following operations and effects.

(1) In the solenoid valve 1, the shaft 22 is supported by the first bearing portion 51 formed on the core member 23 and the second bearing portion 52 formed on the second bottom portion 214 of the cover member 21. Thus, compared to a case where, for example, the solenoid valve includes a first bearing bushing and a second bearing bushing as described in JP 2014-105726 A, the first embodiment reduces dimensional errors in the radial direction to suppress backlash of the plunger 24 and the shaft 22. This enables the air gap between the outer peripheral surface 24a of the plunger 24 and the inner peripheral surface 233a of the rib portion 233 of the core member 23 to be made smaller. That is, the solenoid valve 1 can be reduced in size, with the plunger 24 and the shaft 22 allowed to slide smoothly.

(2) The second bearing portion 52 is formed by providing the sliding hole 214a in the second bottom portion 214. This allows prevention of a decrease in magnetic flux density resulting from the interposition of the second bearing bushing disposed between the cover member and the plunger, on the magnetic path through which the magnetic flux is passed as in the case of the solenoid valve described in JP 2014-105726 A, thus enabling a reduction in magnetic resistance. Consequently, a size increase of the solenoid valve 1 can be suppressed.

(3) The inter-bearing central position M, which is the intermediate point between the axially central position O1 and the axially central position O2, lies within the axial range of the recess 234. Thus, a load imposed on the shaft 22 by a magnetic attractive force acting on the end 241 of the plunger 24 can be approximately evenly distributed between the first bearing portion 51 and the second bearing portion 52. This prevents backlash of the plunger 24 and the shaft 22 in the radial direction, and allows the shaft to slide smoothly in the axial direction.

(4) The inner peripheral surface 213a of the inner tubular portion 213 of the cover member 21 directly faces the outer peripheral surface 24a of the plunger 24. Thus, compared to the case where, for example, the first and second bearing bushings described in JP 2014-105726 A are interposed between the inner tubular portion 213 and the outer peripheral surface 24a, the first embodiment enables the air gap between the cover member 21 and the plunger 24 to be made smaller. That is, the solenoid valve 1 can be reduced in size.

Figure 4:
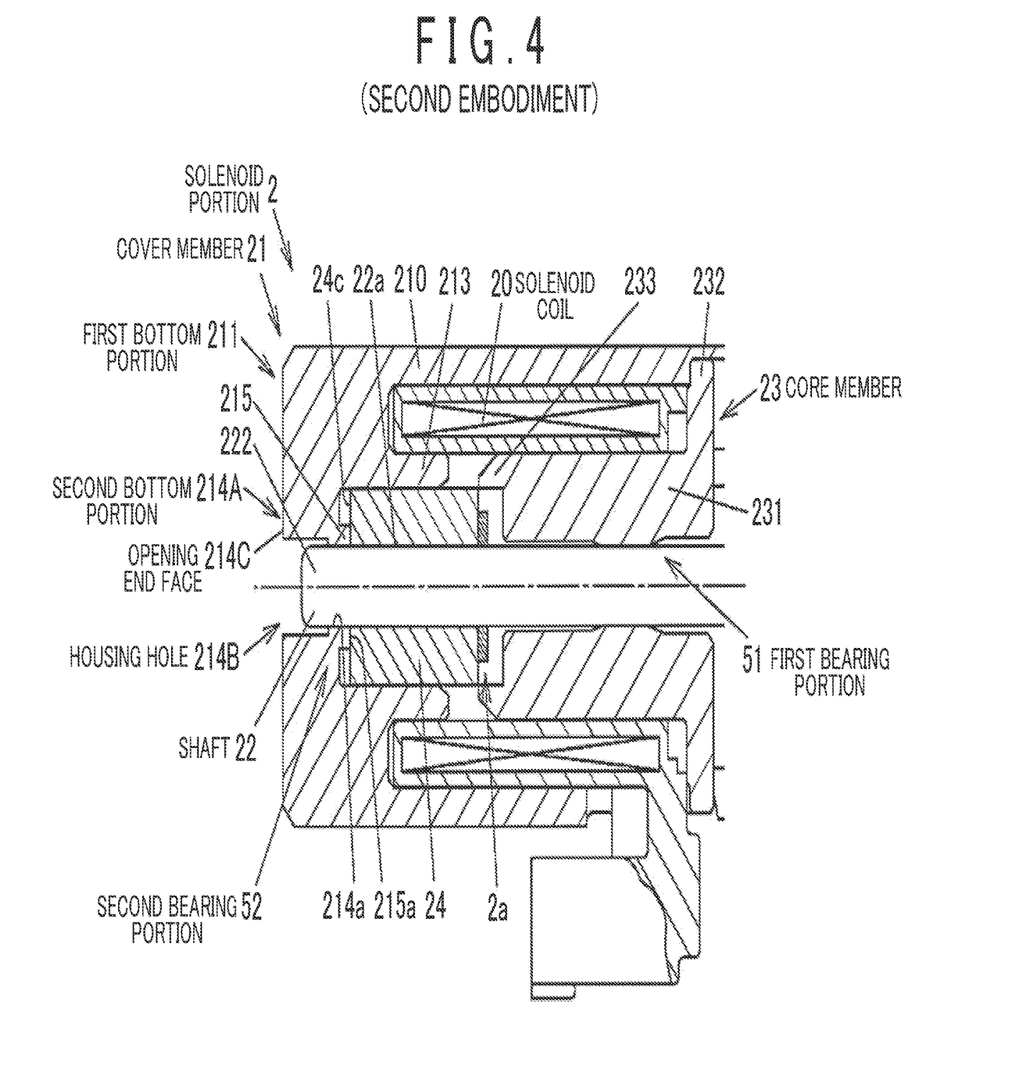
FIG. 4 is a sectional view of a solenoid valve according to a second embodiment of the present invention in a configuration example.

Now, a variation according to a second embodiment of the present invention will be described with reference to FIG. 4. FIG. 4 depicts the solenoid portion 2 of the solenoid valve 1 according to the second embodiment and a peripheral portion thereof, in a configuration example.

The solenoid valve according to the second embodiment has the same configuration as that of the solenoid valve 1 according to the first embodiment except that a second bottom portion 214A according to the second embodiment is shaped differently from the second bottom portion 214 according to the first embodiment. Components in FIG. 4 having functions substantially similar to the functions of the components described in the first embodiment are denoted by the same reference numerals and duplicate descriptions are omitted.

In the second bottom portion 214A according to the present variation, a housing hole 214B is formed in which the base end 222 of the shaft 22 protruding outward from the sliding hole 214a is housed. An inner surface of the housing hole 214B faces the outer peripheral surface 22a of the base end 222 of the shaft 22 via a gap.

The shaft 22 is inserted through the sliding hole 214a to protrude outward from the second bearing portion 52 in the axial direction. The base end 222 of the shaft 22 protruding from the second bearing portion 52 is disposed in the housing hole 214B. The outer peripheral surface 22a of the base end 222 faces an inner surface of the housing hole 214B via a gap. That is, the base end 222 of the shaft 22 is housed in the housing hole 214B without protruding from an opening end face 214C of the housing hole 214B.

In addition to the operations and effects of the first embodiment, the solenoid valve according to the variation configured as described above produces the following effect. In the variation, even when the plunger 24 has moved closest to the second bottom portion 214A within the housing space 2a, the shaft 22 does not protrude from the opening end face 214C of the cover member 21. Thus, for example, when the solenoid valve is assembled in an attachment target apparatus, a possible inadvertent impact made on the shaft 22 is prevented which may impair the functions of the solenoid portion 2. Consequently, the solenoid valve can be safely attached to the attachment target apparatus.

Now, a third embodiment of the present invention will be described with reference to FIG. 5. Components of the third embodiment having functions substantially similar to the functions of the components described in the first embodiment are denoted by the same reference numerals and duplicate descriptions are omitted.

Figure 5A:
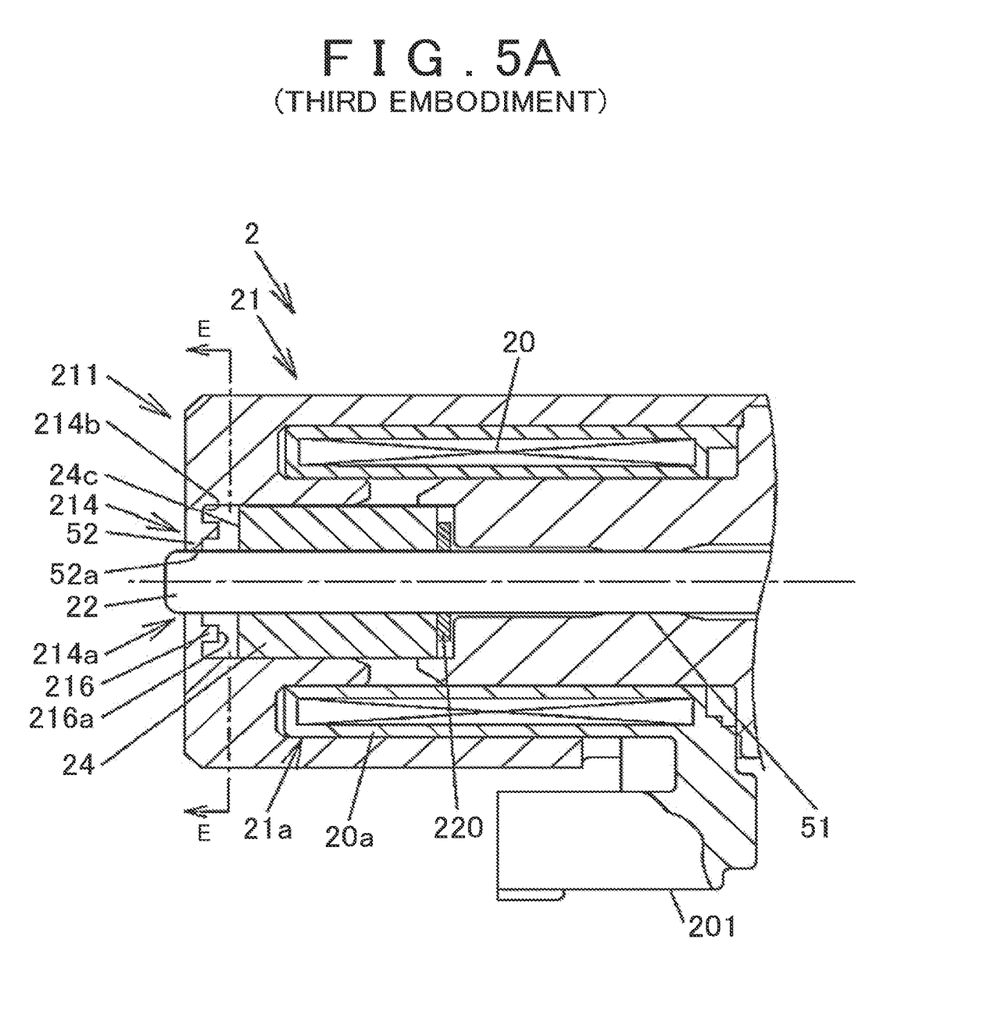
FIG. 5A is an enlarged view of a peripheral portion of a second bearing in a solenoid valve according to a third embodiment of the present invention, depicting the energized state.
Figure 5B:
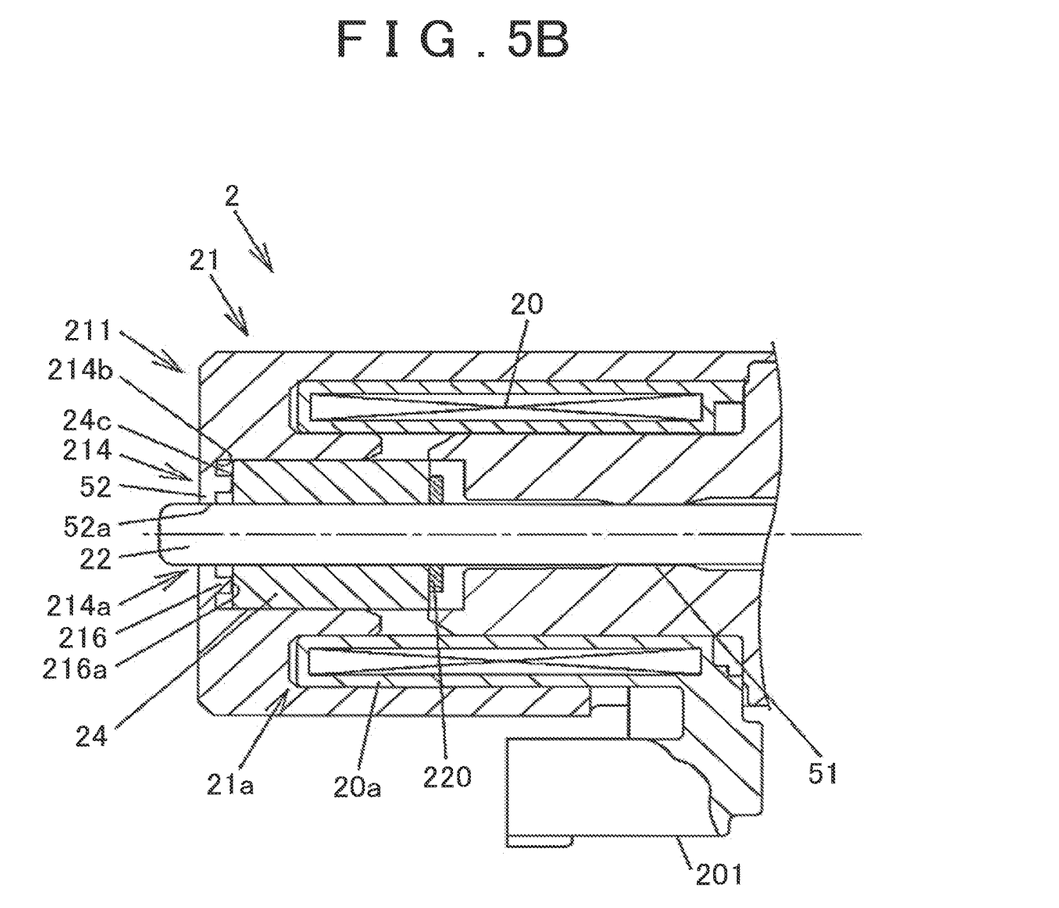
FIG. 5B is an enlarged view of the peripheral portion of the second bearing in the solenoid valve according to the third embodiment of the present invention, depicting the de-energized state.
Figure 5C:
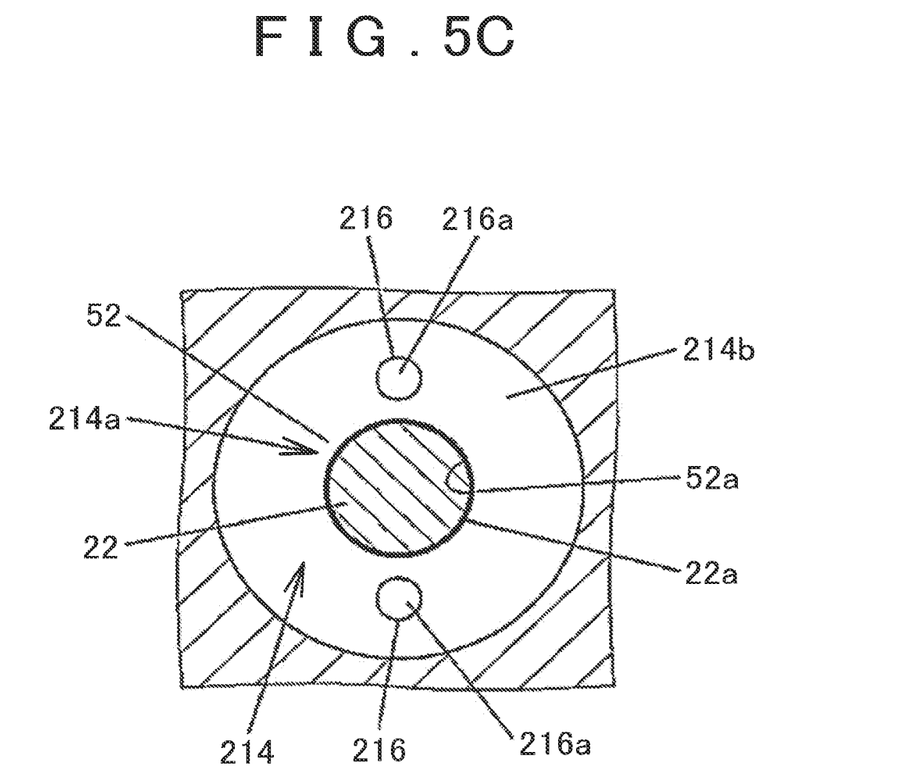
FIG. 5C is a sectional view taken along line E-E in FIG. 5A.

FIG. 5A and FIG. 5B are enlarged views of a peripheral portion of the second bearing portion 52 of the solenoid valve according to the third embodiment. FIG. 5A depicts an energized state, and FIG. 5B depicts a de-energized state. FIG. 5C is a sectional view taken along line E-E in FIG. 5A.

In the first embodiment, the annular protruding portion 215 is provided so as to protrude from the second bottom portion 214 of the cover member 21 along the shaft 22. In the present embodiment, instead of the annular protruding portion 215, a plurality of island-like protrusions 216 is provided on a surface of the second bottom portion 214 of the cover member 21 that faces the housing space 2a. The protrusions 216 may be formed by, for example, forging.

The solenoid valve according to the present embodiment is configured similarly to the solenoid valve according to the first embodiment except that the protrusions 216 are provided instead of the annular protruding portion 215. In the present embodiment, the second bearing portion 52 does not include the annular protruding portion 215 and is thus formed to be smaller than the second bearing portion 52 of the first embodiment in the length in the axial direction of the shaft 22.

The protrusions 216 are provided outside the sliding hole 214a in the radial direction, that is, outside the second bearing portion 52. The height of the protrusion 216 from an inner surface 214b of the second bottom portion 214 is the same as the height of the annular protruding portion 215 in the first embodiment. In the present embodiment, the second bottom portion 214 is provided with the two protrusions 216. However, one or three or more protrusions 216 may be provided. In the present embodiment, the protrusion 216 is cylindrical and has a distal end face 216a that is a flat surface. However, the protrusion 216 may be semispherical. When the protrusion 216 is cylindrical, the distal end face 216a of the protrusion 216 desirably has a diameter that is two-thirds or less of the radial width of the inner surface 214b of the annularly formed second bottom portion 214.

The end face 24c of the plunger 24 is separated from the protrusions 216 when a current is passed through the solenoid coil 20, and is pressed against the distal end faces 216a of the protrusions 216 when no current is passed through the solenoid coil 20. That is, the protrusions 216 function as a receiving portion that receives a biasing force of the coil spring 6 at the second bottom portion 214 of the cover member 21 via the shaft 22 and the plunger 24.

The present embodiment not only produces the operations and effects described in the first embodiment but also restrains smooth movement of the plunger 24 from being hindered by the surface tension of the working fluid flowing into the housing space 2a through, for example, the slight gap between the sliding contact surface 52a of the second bearing portion 52 and the outer peripheral surface 22a of the shaft 22. In other words, if the second bottom portion 214 of the cover member 21 is not provided with the protrusions 216, the end face 24c of the plunger 24 contacts the inner surface 214b of the second bottom portion 214 over a wide area. Thus, when a current is passed through the solenoid coil 20, movement of the plunger 24 may be hindered by the surface tension of the working fluid between the inner surface 214b of the second bottom portion 214 and the end face 24c of the plunger 24. However, the present embodiment allows the plunger 24 to move smoothly. Consequently, the plunger 24 and the shaft 22 can operate smoothly and respond more appropriately.

In the present embodiment, even if burrs are formed in the housing space 2a when the sliding hole 214a is formed in the second bottom portion 214, the protrusions 216 prevents the burrs from coming into contact with the plunger 24. Consequently, deburring may be simplified.

Now, a plurality of variations of a third embodiment in which the arrangement of the protrusions 216 is varied will be described with reference to FIGS. 6A to 6F. FIGS. 6A to 6F are sectional views of the protrusions 216 in the variations, in which the inner surface 214b of the second bottom portion 214 is viewed in plan taken along line E-E in FIG. 5A.

Figure 6A:
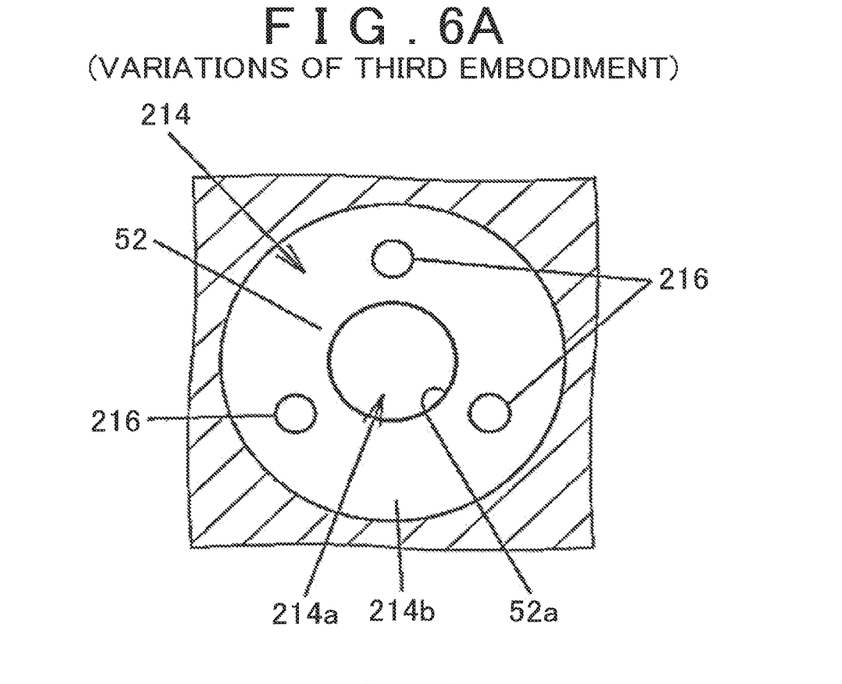
FIG. 6A is a diagram of protrusions in a variation of the third embodiment, in which an inner surface of a second bottom portion is viewed in plan.

FIG. 6A depicts a variation of the protrusions 216 formed to protrude from the inner surface 214b of the second bottom portion 214 and the number of which is three. While no current is passed through the solenoid coil 20, the end face 24c of the plunger 24 is in contact with each of the three protrusions 216. If three or more protrusions 216 are provided in this manner, at least a part of the sliding hole 214a is desirably included in a polygon formed by joining central points of the protrusions 216 together with lines when the inner surface 214b of the second bottom portion 214 is viewed from the front. When the protrusions 216 are arranged in this manner, the plunger 24 is restrained from being tilted when no current is passed through the solenoid coil 20.

Figure 6B:
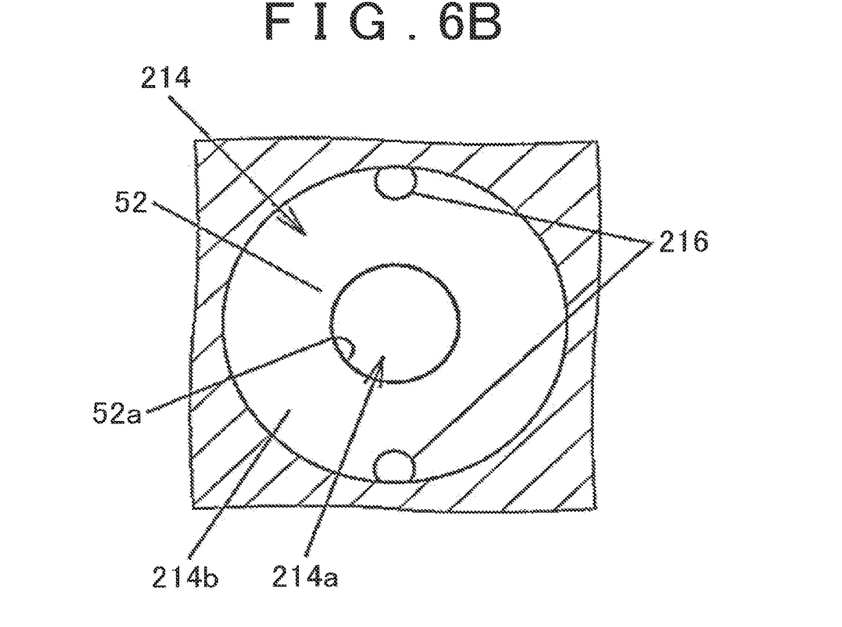
FIG. 6B is a diagram of protrusions in another variation of the third embodiment, in which the inner surface of the second bottom portion is viewed in plan.

FIG. 6B is a variation in which two protrusions 216 are provided at an outer edge of the inner surface 214b of the second bottom portion 214. This arrangement of the protrusions 216 produces the same operations and effects as those of the third embodiment.

Figure 6C:
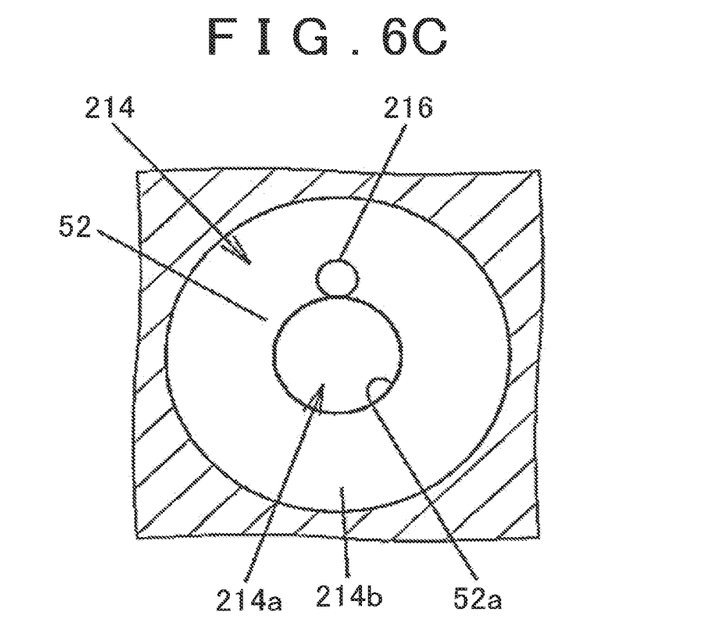
FIG. 6C is a diagram of protrusions in a yet another variation of the third embodiment, in which the inner surface of the second bottom portion is viewed in plan.
Figure 6D:
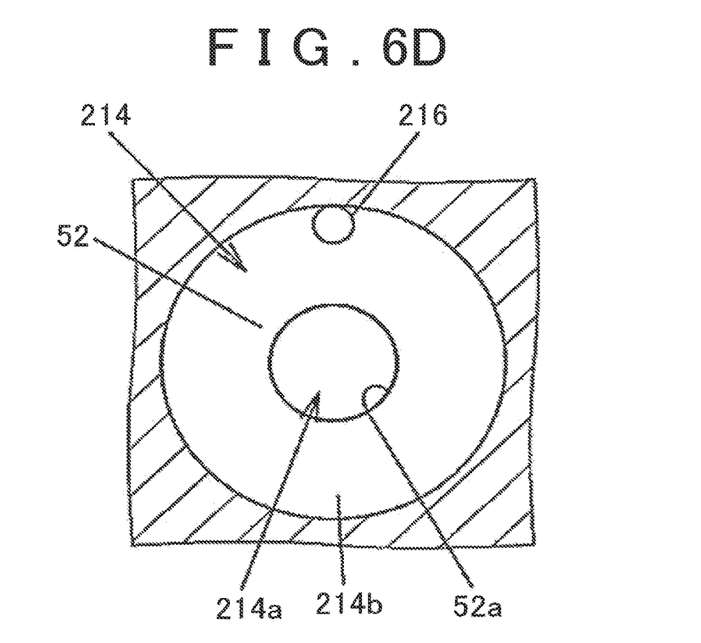
FIG. 6D is a diagram of protrusions in still another variation of the third embodiment, in which the inner surface of the second bottom portion is viewed in plan.

FIG. 6C depicts a variation in which one protrusion 216 is provided near the sliding hole 214a in the second bottom portion 214. FIG. 6D depicts a variation in which one protrusion 216 is provided at the outer edge of the inner surface 214b of the second bottom portion 214. Even when one protrusion 216 is provided in this manner, movement of the plunger 24 is restrained from being hindered by the surface tension of the working fluid.

Figure 6E:
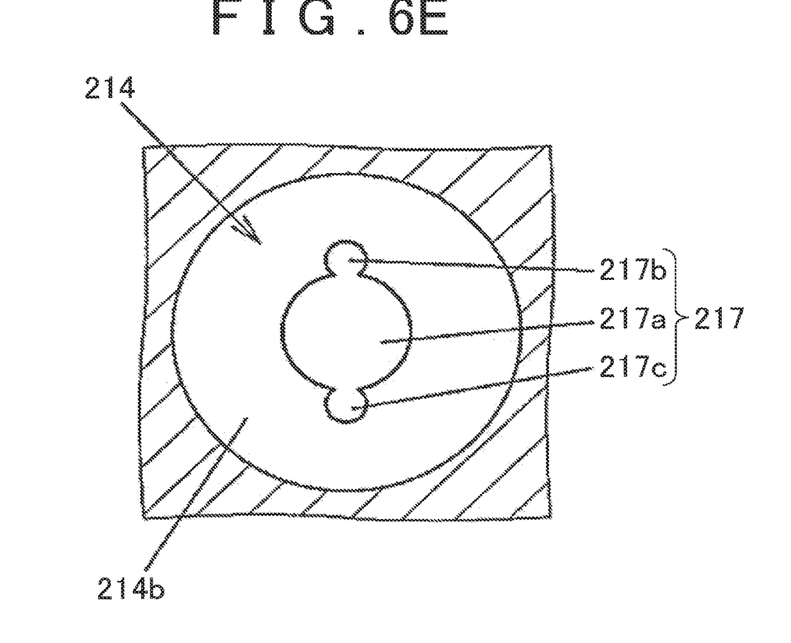
FIG. 6E is a diagram of protrusions in a further variation of the third embodiment in which the inner surface of the second bottom portion is viewed in plan.
Figure 6F:
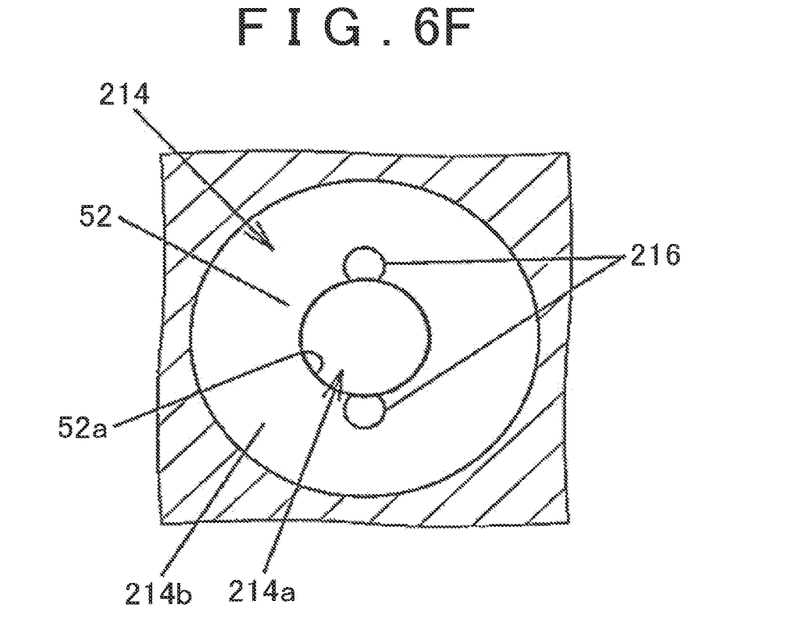
FIG. 6F is a diagram of protrusions in further another variation of the third embodiment, in which the inner surface of the second bottom portion is viewed in plan.

FIG. 6E and FIG. 6F illustrate the state of the protrusions 216 provided around the sliding hole 214a before and after the sliding hole 214a is formed in the second bottom portion 214. FIG. 6E illustrates the state before the sliding hole 214a is formed. In this state, a protrusion 217 is formed which has a cylindrical first protruding portion 217a and a second protruding portion 217b and a third protruding portion 217c formed to sandwich the first protruding portion 217a between the second and third protruding portions 217b and 217c.

When the sliding hole 214a is formed in an area where the first protruding portion 217a is formed using a cutting tool such as a drill, the areas of the second protruding portion 217b and the third protruding portion 217c remain uncut. This results in forming the two protrusions 216 as depicted in FIG. 6B. Forming a plurality of the protrusions 216 in this manner facilitates machining of the cover member 21.

What is claimed is:

1. A solenoid valve comprising:
  a cylindrical sleeve with a plurality of ports formed therein, through which a working fluid can flow;
  an elongated spool configured to move through the sleeve in an axial direction to open and close the ports; and
  a solenoid portion that moves the elongated spool in the axial direction with respect to the sleeve, wherein
  the solenoid portion includes a tubular solenoid coil able to be supplied with a current to generate a magnetic force;
  a cover member made of a magnetic material surrounding the solenoid coil;
  a shaft supported so as to be movable in the axial direction along a central axis of the solenoid coil to apply an axial moving force to the elongated spool;
  a plunger that is movable in the axial direction along with the shaft, and
  a magnetic material core configured to attract the plunger using the magnetic force generated in the solenoid coil, wherein
  the cover member has an outer tubular portion that covers an outer periphery of the solenoid coil, a first bottom portion that covers an end of the solenoid coil that is on the opposite side to the sleeve, an inner tubular portion interposed between the plunger and an end of the solenoid coil adjacent the first bottom portion, and a second bottom portion formed to protrude inward in a radial direction with respect to the inner tubular portion, and facing the plunger in the axial direction,
  the magnetic material core is interposed between the shaft and the solenoid coil in the radial direction and faces the plunger and the inner tubular portion of the cover member in the axial direction, and the magnetic material core has a cylindrical portion with an insertion hole which is formed in a central portion of the cylindrical portion and through which the shaft is inserted, and a flange portion that couples the cylindrical portion and the outer tubular portion of the cover member together,
  the shaft is supported by a first bearing portion of the magnetic material core and a second bearing portion of the second bottom portion of the cover member,
  the first bearing portion is formed by a part of the cylindrical portion of the magnetic material core in the axial direction protruding inward in the radial direction so as to contact an outer peripheral surface of the shaft in a sliding manner, and
  the second bearing portion is formed by a sliding hole in the second bottom portion of the cover member, the sliding hole having a surface contacting an outer peripheral surface of the shaft protruding from the plunger such that the shaft is held so as to slide freely.

2. The solenoid valve according to claim 1, wherein,
  in the magnetic material core, a recess is formed in which an end of the plunger is fitted when a current is passed through the solenoid coil, and
  an inter-bearing central position that is an intermediate point between an axially central position of the first bearing portion and an axially central position of the second bearing portion lies within an axial range of the recess.

3. The solenoid valve according to claim 1, wherein,
  an inner peripheral surface of the inner tubular portion of the cover member directly faces an outer peripheral surface of the plunger.

4. The solenoid valve according to claim 2, wherein,
  an inner peripheral surface of the inner tubular portion of the cover member directly faces an outer peripheral surface of the plunger.

5. The solenoid valve according to claim 1, wherein,
  a housing hole is formed in the second bottom portion of the cover member, wherein an end of the shaft protruding outward from the sliding hole is housed in the housing hole, and wherein the housing hole has an inner surface facing the outer peripheral surface of the shaft via a gap, and
  the shaft does not protrude, in the axial direction, from the housing hole so as to protrude from the cover member.

6. The solenoid valve according to claim 2, wherein,
  a housing hole is formed in the second bottom portion of the cover member, wherein an end of the shaft protruding outward from the sliding hole is housed in the housing hole, and wherein the housing hole has an inner surface facing the outer peripheral surface of the shaft via a gap, and
  the shaft does not protrude, in the axial direction, from the housing hole so as to protrude from the cover member.

7. The solenoid valve according to claim 3, wherein,
  a housing hole is formed in the second bottom portion of the cover member, wherein an end of the shaft protruding outward from the sliding hole is housed in the housing hole, and wherein the housing hole has an inner surface facing the outer peripheral surface of the shaft via a gap, and
  the shaft does not protrude, in the axial direction, from the housing hole so as to protrude from the cover member.

* * * * *